United States Patent Office 3,799,888
Patented Mar. 26, 1974

3,799,888
METHOD OF PREPARING A CATALYST OF VANADIUM-TITANIUM OXIDES FOR VAPOR-PHASE OXIDATION AND OXIDIZING AMMONOLYSIS OF AROMATIC AND HETEROCYCLIC COMPOUNDS
Boris Viktorovich Suvorov, ulitsa Pushkina 102/44, kv. 27; Alfred Davydovich Kagarlitsky, ulitsa Timiryazeva 71, kv. 44; Dauren Khamitovich Sembaev, ulitsa Furmanova 91/97, kv. 7; Ivetta Sergeevna Kolodina, 7 Mikroraion 36, kv. 18; and Aleftina Ivanovna Loiko, ulitsa Dekhakanskaya 139, all of Alma-Ata, U.S.S.R.
No Drawing. Filed Oct. 28, 1970, Ser. No. 84,933
Int. Cl. B01j 11/06, 11/22
U.S. Cl. 252—469
5 Claims

ABSTRACT OF THE DISCLOSURE

A method of preparing a catalyst of vanadium-titanium oxides for vapor-phase oxidation and oxidizing ammonolysis of aromatic and heterocyclic compounds comprising preparing a powdery mixture of vanadium pentoxide and titanium dioxide with the mole ratio of 1:0.6–32, respectively. The aforesaid mixture is pressed into tablets and then exposed to heat treatment in air at a temperature of from 650° C. to 1000° C.

Said method is technologically simple and makes it possible to obtain a catalyst featuring high activity and selectivity as well as high mechanical strength and thermal stability.

---

The invention relates to methods of preparing a catalyst of vanadium-titanium oxides for vapor-phase oxidation and oxidizing ammonolysis of aromatic and heterocyclic compounds.

Methods are known for preparing vanadium-titanium oxides catalysts which are fused or precipitated on carriers. When the catalyst is obtained by fusion, vanadium pentoxide and titanium dioxide are used as the starting materials and when it is obtained by precipitation, water soluble salts of vanadium and titanium: ammonium vanadate, vanadium oxalate, titanium nitrate and etc. are used as the starting materials. Catalysts prepared by methods of the known art are used for vapor-phase oxidation and oxidizing ammonolysis of a number of organic compounds including aromatic and heterocyclic ones. Reacting o-xylene and naphthalene in the presence of these catalysts gives phthalic anhydride in the amount of up to 65% of the theoretical value as calculated from the starting materials (see U.S. Pat. No. 2,157,965; C.A., 33.6350, 1939; Danish Pat. No. 64,720; C.A., 44, 1939, 1950; French Pat No. 1093512; C.A., 52.11320, 1958). Fused titanium vanadate is used for oxidizing ammonolysis of alkyl benzenes and picolines to obtain their nitriles and imides (see U.S.S.R. Author's Certificates Nos. 119,878, 122,483, 123,156).

In spite of their satisfactory selectivity properties, the catalysts of vanadium-titanium oxides precipitated on carriers are of a low mechanical strength, whereas the fused catalysts feature a fairly low thermal stability. Therefore, they can not endure high loads.

Besides, the known methods for preparing fused catalysts and those precipitated on carriers are technologically complicated.

An object of the present invention is to provide a method which makes it possible to obtain the catalyst of vanadium-titanium oxides for vapor-phase oxidation and oxidizing ammonolysis of aromatic and heterocyclic compounds featuring a higher selectivity ad activity.

Another object of the present invention is to provide a method which makes it possible to obtain the catalyst of vanadium-titanium oxides featuring higher mechanical strength and thermal stability.

Still another object of the invention is to provide a method for preparing the catalyst of vanadium-titanium oxides, which is more simple technologically.

With these and other objects in view, the invention consists in preparing a powdery mixture of vanadium pentoxide and titanium dioxide, their mole ratio being 1:0.6–32, respectively. Said mixture is tableted, whereupon it is exposed to heat treatment at a temperature of from 650° C. to 1000° C. in atmospheric air.

An increase in vanadium content in the vanadium-titanium catalyst makes it possible to enhance its activity and selectivity in vapor-phase oxidation and oxidizing ammonolysis (it is impracticable to obtain a fused catalyst with a higher content of titanium dioxide due to its high melting point).

To obtain a catalyst of a higher activity, it is advisable to add oxides of metals of variable valences to a powdery mixture of the starting components before pressing.

The preparation of the catalyst includes the following steps: powdery vanadium pentoxide and titanium dioxide are close homogenized in the predetermined proportion in a ball mill. An initial composition is composed of 1 mole of vanadium pentoxide and from 0.6 to 32 moles of titanium dioxide, which exceeds the amount necessary for forming titanium vanadate. After being moistened, the mixture is pressed in the usual way into tablets of equal diameter and of 3–5 mm. height and subjected to heat treatment in an electric oven in air at a temperature of from 650° C. to 1000° C. for 30–150 minutes.

The heat treatment conditions are of primary importance since they govern the formation of an active phase of the catalyst.

The catalyst can be modified by Cr, Mn, Cu, Nb, Mo, Ag, Sn, Ta, W, Bi, Th and other metal oxides of variable valences which are introduced into the mixture.

The present catalyst with various proportions of vanadium and titanium oxides as well as with additions of transition of metal oxides as modifiers has been tested in oxidizing o-xylene, some derivatives of di- and trialkyl benzenes, durene, naphthalene pyrene and in oxidizing ammonolysis of mono-, di- and polyalkyl benzenes, their mono-, di- and polyhalogenated derivatives, mono- and dialkyl pyridines and a great number of their oxygen-containing compounds. The catalyst has shown a higher selectivity, mechanical strength and thermal stability than the known vanadium-titanium contacts and has endured a greater load without losing its activity.

This method is characterized by the following advantages:

(1) The catalyst obtained feature high activity and selectivity in vapor-phase oxidation and oxidizing ammonolysis of aromatic and heterocyclic compounds;

(2) The catalyst obtained possesses high mechanical strength and offers higher thermostability. It is operable

TABLE NO. 1

| Number | Composition of the catalyst, mole | | Heat treatment conditions | | Minutes | Starting compound | The rate of feed | | | | Reaction temperature, °C. | Reaction products | Yield, percent of theoretical amount as calculated from starting materials |
|---|---|---|---|---|---|---|---|---|---|---|---|---|---|
| | $V_2O_5$ | $TiO_2$ | t, °C. | | | | Organic compound, g/hour per liter of the catalyst | Air, l/hour per l. of the catalyst | Ammonia, g/hour per liter of the catalyst | Water, g/hour per liter of the catalyst | | | |
| 2 | 1 | 8 | 900 | | 90 | o-Xylene | 202 | 7,800 | | | 400 | Phthalic anhydride | 58.0 |
| 3 | 1 | 2 | 700 | | 120 | 4-tert.butyl-o-xylene | 405 | 15,000 | | | 390 | 4-tert.butylphthalic anhydride | 60.0 |
| 4 | 1 | 4 | 800 | | 90 | Durene | 210 | 48,000 | | | 410 | Pyromellitic dianhydride | 55.0 |
| 5 | 1 | 8 | 900 | | 90 | Naphthalene | 200 | 40,000 | | | 400 | Phthalic anhydride | 86.0 |
| 6 | 1 | 3 | 900 | | 80 | Pyrene | 100 | 38,000 | | | 410 | Pyrenanhydride; 1,4,5,8-naphthalene tetracarboxylic dianhydride | 30.0 / 10.0 | for a prolonged period of time (more than 10,000 hours) with a high efficiency by starting materials (up to 500 gr. per liter of the catalyst per hour) and can endure random overheating and overload conditions without losing its activity and without requiring regeneration;

(3) The technique of the preparation of the catalyst is very simple and enables the contents of titanium dioxide and modifying additives to be varied within a broad range.

For a better insight into the invention there are the following examples of preparing the catalyst of vanadium-titanium oxides for vapor-phase oxidation and oxidizing ammonolysis of aromatic and heterocyclic compounds.

EXAMPLE 1

365 gr. of vanadium pentoxide and 160 gr. of titanium dioxide (the mole ratio is $V_2O_5:TiO_2=1:1$) were crushed to powder, mixed and pressed into tablets of 3–5 mm. in size. The tablets were exposed to heat treatment in air at 650° C. for 120 minutes after the required temperature had been reached.

The catalyst obtained was charged in the amount of 2.5 ml. into a reactor made of molybdenum glass with a reaction pipe 20 mm. in diameter and 120 mm. in length. A mixture of o-xylene vapor and air was passed through a layer of the catalyst at 390° C. The rate of feed was 472 gr. of o-xylene and 15,600 liters of air/hour per liter of the catalyst. The duration of the experiment was 10 hours. The total amount of o-xylene supplied was 11.8 gr.

The reaction products were fed into three scrubbers connected in series. The oxidation products were washed by water in the first scrubber and the unreacted o-xylene was washed by methanol in two others. Phthalic and malic anhydrides were identified by the use of a polarographic technique. o-Xylene, toluic aldehyde, carbon oxides and other products were identified by the use of a chromatographic technique. The total amount of phthalic anhydrides obtained amounted to 10.6 gr. comprising 64.5% of the theoretical value as calculated from o-xylene.

In addition the catalysts of various ratios of vanadium and titanium oxides were tested in the oxidation of 4-tert.-butyl-oxylene, durene, naphthalene and pyrene. Experiments (Nos. 2–6) are illustrated in Table 1.

EXAMPLE 7

91 gr. of $V_2O_5$, 160 gr. of $TiO_2$ and 0.27 gr. of $Nb_2O_5$ (the mole ratio being $V_2O_5:TiO_2:Nb_2O_5=1:4:0.002$) were pressed into tablets of 3–5 mm. in size and exposed to heat treatment at 800° C. for 90 minutes in air. 10 ml. of the catalyst obtained were charged into a reactor of a flow type with a reaction pipe made of a stainless steel 22 mm. in diameter and 750 mm. in length. A mixture of durene and air vapors was passed through a layer of the catalyst at 370 C. The rate of feeding is 210 gr. of durene and 48,000 liters of air/hour per liter of the catalyst. The experiment's duration was 20 hours. The total amount of durene supplied was 42 gr.

The reaction products were trapped in a coil system washed with water. After the experiment was completed, the unreacted durene was filtered out and an aqueous solution of the reaction products evaporated to dryness and was subjected to an additional oxidation with 20% aqueous solution of nitric acid at 170° C. and 35 atm. pressure for 10 hours. Pyromellitic acid obtained was filtered out and recrystallized from water after which the melting point was 250° C. and neutralization equivalent was 63.5.

Found, percent: C—46.7; 46.63; H—2.41; 2.62; $C_{10}N_6O_4$. Calculated, percent: C—47.0; H—2.37.

The total amount of pyromellitic acid obtained was 45.3% of the theoretical amount of durene.

EXAMPLE 8

The catalyst described in Example 1 (the mole ratio of oxides being $V_2O_5:TiO_2=1:1$) was charged into a reactor with a reaction pipe made of stainless steel and having 20 mm. in diameter and 1200 mm. in length in the amount of 75 ml. A mixture of reacting components composed of o-xylene, air, ammonium and water vapors was fed into the reactor at 390° C. The rate of feed was 36.0 gr. of o-xylene, 3200 liters of air, 168 gr. of ammonia and 400 gr. of water/hour per liter of the catalyst. The duration of the experiment was 10 hours. The total amount of o-xylene supplied was 27 gr.

The reaction products were trapped in a coil system scrubbed by a 5% aqueous solution of sulfuric acid. Solid reaction products were filtered out and washed by benzene. After being dried, the residue comprised phthalimide having a melting point of 235° C. An aqueous filtrate was extracted with benzene.

After being dried, the residue comprised phthalimide having a melting point of 235° C. An aqueous filtrate was extracted with benzene.

With benzene having been distilled off and the residue washed with petroleum ether, a product was obtained with a melting point of 140° C. which is in agreement with that for phthalic dinitrile.

There were obtained 11.4 gr. of dinitrile and 16.0 gr. of phthalic imide which comprises 35% and 43%, respectively, of the theoretical amount as calculated from o-xylene.

EXAMPLE 9

The composition and heat treatment conditions of the catalyst were the same as in Example 1.

The catalyst was charged into the reactor described in Example 8. A mixture of p-xylene vapors, air, ammonia and water was supplied into the same reactor. The reaction temperature was 400° C. The rate of feed was 35.5 gr. of p-xylene, 3200 liters of air, 134 gr. of ammonia and 350 gr. of water/hour per liter of the catalyst. The experiment was carried out for 10 hours. The total amount of p-xylene was 26.6 gr.

The reaction products were trapped in a coil system scrubbed with water. The solid product was filtered out, washed with hexane and dried, thereupon its melting point was 222° C. which was in agreement with that for terephthalic dinitrile. The total amount of terephthalic dinitrile was 26.2 gr. comprising 82% of the theoretical amount as calculated from p-xylene supplied.

EXAMPLE 10

273 gr. of $V_2O_5$ and 240 gr. of $TiO_2$ (the mole ratio being $V_2O_5:TiO_2=1:2$) were pressed into tablets of 3–5 mm. in size and exposed to heat treatment in air at 700° C. for 120 minutes. The catalyst in the amount of 70 ml. was charged into a reactor with a reaction pipe made of steel 20 mm. in diameter and 1100 mm. in length. A mixture of 13.5 gr. of methyltoluene, 930 liters of air, 32.4 gr. of ammonia and 227 gr. of water was passed through the reactor. The experiment was carried out for 12 hours. 33.9 gr. of m-ethyltoluene was supplied.

The isolation of the reaction products and their trapping was carried out in much the same way as in Example 9. 23.1 gr. of isophthalic dinitrile was obtained comprising 64.7% of the theoretical amount as calculated from the starting materials.

EXAMPLE 11

The catalyst with the mole ratio of $V_2O_5:TiO_2=1:2$ obtained as described in Example 10 was charged into a reactor described in Example 8 in the amount of 75 ml. A vaporous mixture of pseudocumene, air, ammonia and water was passed through a layer of the catalyst. The reaction took place at 380° C. The rate of feed was 36 gr. of pseudocumene, 3200 l. of air, 134 gr. of ammonia and 350 gr. of water/hour per liter of the catalyst. The experiment was carried out for 10 hours. The total amount of pseudocumene supplied was 27 gr.

The isolation of the reaction products and their trapping was carried out in the same manner as in Example 8. The solid product melted at 232° C. and was identified as 4-cyanophthalimide, after being washed with benzene and dried.

Found, percent: C—62.65; 62.92; H—2.34; 2.53; N—15.7; 15.87. $C_9H_4N_2O_2$. Calculated, percent: C—62.73; H—2.32; N—16.25.

The total amount of 4-cyanophthalimide obtained comprised 17.5 gr. which corresponds to 45% of the theoretical quantity as calculated from the starting materials passed through.

EXAMPLE 12

182 gr. of $V_2O_5$ and 320 gr. of $TiO_2$ (the mole ratio is $V_2O_5:TiO_2=1:4$) was pressed into tablets and exposed to heat treatment in air medium at 800° C. for 90 minutes. 100 ml. of the catalyst was charged into a reactor with a steel reaction pipe having 20 mm. in diameter and 1500 mm. in length. A vaporous mixture of acenaphthene, air, ammonia and water has been passed through it. There was supplied 75 gr. of acenaphthene, 2400 liters of air, 161 gr. of ammonia and 476 gr. of water/hour per liter of the catalyst. The reaction was carried out at 380° C. The duration of the experiment was 8 hours. 60 gr. of acenaphthene was supplied.

The recovery of the reaction products was carried out as described in Example 8. A solid product obtained by filtering the reaction mixture was composed of naphthalimide and acenaphthene. To separate the latter, the product was washed with petroleum ether. A pure naphthalimide, thus obtained, melted at 300° C. A sample composed of imide obtained and that purified had the melting point of 300° C. When processing with a 5% aqueous solution of sodium carbonate there was recovered from the catalyst naphthalene dicarboxylic anhydride as the sodium salt of naphthalene dicarboxylic acid.

There was obtained 39.1 gr. of naphthalimide comprising 51% and 76% of the theoretical amounts of acenaphthene passed through and that unreacted, respectively, and 8.9 gr. of naphthalene dicarboxylic anhydride comprising 11.5% and 17.2% of acenaphthene passed through and that unreacted, respectively.

EXAMPLE 13

75 ml. of the catalyst composed of $V_2O_5:TiO_2=1:4$ and obtained as described in Example 12 was charged into a reactor with a steel reaction pipe 20 mm. in diameter and 1200 mm. in length. A mixture composed of 2,4-dichlorotoluene, air, ammonia and water was passed through the reactor. The reaction was carried out at 380° C. There was supplied 17.3 gr. of 2,4-dichlorotoluene, 2400 liters of air, 36 gr. of ammonia and 213 gr. of water/hour per liter of the catalyst. The experiment was carried out for 12 hours. The total amount of 2,4-dichlorotoluene supplied was 31 gr.

The reaction products were recovered in a coil system. A crystalline 2,4-dichloro-benzonitrile was filtered out, washed with water and dried. After being recrystallized with petroleum ether, the product obtained had a melting point of 61° C.

Found, percent: C—48.88; H—1.52; Cl—40.98; N—8.20. $C_7H_3NCl_2$. Calculated, percent: C—48.84; H—1.74; Cl—41.28; N—8.14.

There was obtained 26.6 gr. of 2,4-dichloro-benzonitrile comprising 80% of the theoretical amount as calculated from the starting materials supplied.

TABLE NO. 2

| Number | Composition of the catalyst, mole | | | Heat treatment conditions | | Starting compound | The rate of feed | | | | Reaction temperature, °C. | Reaction products | Yield, per cent of theoretical amount as calculated from starting material |
|---|---|---|---|---|---|---|---|---|---|---|---|---|---|
| | V₂O₅ | TiO₂ | | t, °C. | Minutes | | Organic compound g./hour per liter of the catalyst | Air, l./hour per l. of the catalyst | Ammonia, g./hour per liter of the catalyst | Water, g./ hour per liter of the catalyst | | | |
| 15 | 1 | 2 | | 700 | 120 | Toluene | 50.0 | 2,400 | 90.0 | 300 | 380 | Benzonitrile | 92.2 |
| 16 | 1 | 2 | | 700 | 120 | 2,6-dichlorotoluene | 20.0 | 2,000 | 45.5 | 213 | 395 | 2,6-dichlorobenzonitrile | 53.3 |
| 17 | 1 | 4 | | 800 | 90 | 2,3,6-trichlorotoluene | 13.0 | 300 | 30.4 | 213 | 395 | 2,3,6-trichlorobenzonitrile | 65.0 |
| 18 | 1 | 4 | | 800 | 90 | 2,4,6-trichlorotoluene | 20.0 | 1,200 | 30.4 | 213 | 380 | 2,4,6-trichlorobenzonitrile | 68.0 |
| 19 | 1 | 4 | | 800 | 90 | 2,3,5,6-tetrachlorotoluene | 50.0 | 1,200 | 91.4 | 213 | 350 | 2,3,5,6-tetrachlorobenzonitrile | 80.0 |
| 20 | 1 | 4 | | 800 | 90 | Pentachlorotoluene | 60.0 | 1,200 | 91.4 | 213 | 350 | Pentachlorobenzonitrile | 82.0 |
| 21 | 1 | 8 | | 800 | 90 | 2,6-dichlorobenzalchloride | 60.0 | 1,380 | 104.7 | 138 | 380 | 2,6-dichlorobenzonitrile | 92.8 |
| 22 | 1 | 8 | | 800 | 90 | 3,5-dichlorobenzylchloride | 30.0 | 250 | 60.6 | 213 | 380 | 3,5-dichlorobenzonitrile | 98.2 |
| 23 | 1 | 8 | | 800 | 90 | 2,3,6-trichlorobenzylchloride | 51.0 | 1,200 | 60.0 | 213 | 365 | 2,3,6-trichlorobenzonitrile | 94.0 |
| 24 | 1 | 8 | | 800 | 90 | 2,4,6-trichlorobenzotrichloride | 20.0 | 1,200 | 45.5 | 213 | 370 | 2,4,6-trichlorobenzonitrile | 93.5 |
| 25 | 1 | 8 | | 900 | 90 | 2,3,5,6-tetrachlorobenzalchloride | 50 | 1,200 | 91.4 | 213 | 380 | 2,3,5,6-tetrachlorobenzonitrile | 90.0 |
| 26 | 1 | 8 | | 900 | 90 | Pentachlorobenzylchloride | 30.0 | 1,200 | 60.6 | 213 | 365 | Pentachlorobenzonitrile | 91.3 |

EXAMPLE 14

The catalyst, apparatus, technique of trapping and the recovery of the reaction products were the same as in Example 13. A mixture of 2,4-dichlorobenzyl chloride, air, ammonia and water charged into a reactor. The reaction proceeded at 335° C. There was supplied 49.4 gr. of 2.4-dichlorobenzyl chloride, 1200 liters of air, 60.6 gr. of ammonia, 213 gr. of water/hour per liter of the catalyst. The experiment was carried out for 12 hours. The total amount of dichlorobenzyl chloride was 88.8 gr.

There was obtained 65 gr. of 2,4-dichlorobenzonitrile comprising 97.8% of the theoretical amount as calculated from the starting materials supplied.

Data on oxidizing ammonolysis of other chlorinated derivatives of toluene with halogen atoms attached to an aromatic ring and methylene group are listed in Table 2 (Examples Nos. 15–26).

EXAMPLE 27

The catalyst composition, its heat treatment conditions and the dimensions of the reaction chamber into which the finished catalyst was charged were the same as in Example 12. A mixture of 2,5-diiodo-p-xylene, air and water was passed through a layer of the catalyst. The reaction proceeded at 360° C. There was supplied 68 gr. of 2,5-diiodo-p-xylene, 3800 liters of air, 96 gr. of ammonia and 460 gr. of water/hour per liter of the catalyst. The experiment was carried out for 12 hours. 57 gr. of 2,5-diiodo-p-xylene was supplied.

The reaction products were trapped in a coil system scrubbed with water. The catalyzate was washed with petroleum ether. 2,5-diiodoterephthalic dinitrile insoluble in water and in petroleum ether was filtered out, dried and, after being recrystallized with ethyl alcohol, had a melting point of 308° C.

Found, percent: N—7.22; 7.41; $C_8H_2I_2N_2$. It was calculated, percent: N—7.37.

2,5-diiodoterephthalic acid was obtained by hydrolysis of the nitrile thus prepared. The former had constants in correspondence with the literature data.

There was obtained 33 gr. of 2,5-diiodoterephthalonitrile comprising 55% of the theoretical amount as calculated from 2,5-diiodo-p-xylene supplied.

EXAMPLE 28

182 gr. of $V_2O_5$, 639 gr. of $TiO_2$ and 0.73 gr. of $MoO_3$ (with the mole ratio $V_2O_5:TiO_2:MoO=1:8:0.005$) were pressed into tablets of 3–4 mm. in size and exposed to heat treatment in air at 900° C. for 60 minutes. 70 ml. of the catalyst thus obtained was charged into the reactor described in Example 12. A mixture of 2,5-dichloro-p-xylene, air, ammonia and water was passed through a layer of the catalyst at 400° C. There was supplied 42 gr. of 2,5-dichloro-p-xylene, 2570 liters of air, 96 gr. of ammonia and 500 gr. of water/hour per liter of the catalyst. The experiment was carried out for 12 hours. The total amount of 2,5-dichloro-p-xylene supplied was 35 gr.

The isolation and trapping of the reaction products are analogous to Example 27. After being recrystallized with ethyl alcohol, 2,5-dichloroterephthalic dinitrile melted at a temperature of from 207° to 209° C. Upon the hydrolysis of the nitrile thus obtained 2,5-dichloroterephthalic acid with constants corresponding to the literature data is formed.

There was obtained 27 gr. of 2,5-dichloro-terephthalic dinitrile comprising 67.5% of the theoretical amount as calculated from the starting materials supplied.

The catalysts were tested in similar conditions in the oxidizing ammonolysis of a number of fluoro, bromo-, chloro- and iodoxylenes. Satisfactory results were obtained in all cases and the specimens tested revealed high activity and selectivity (Examples Nos. 29–41, Table 3).

TABLE NO. 3

| Number | Catalyst composition, moles | | Heat treatment conditions | | Rate offered | | | | | Reaction products and yield, percent of theoretical amounts by weight of starting materials | | | | |
|---|---|---|---|---|---|---|---|---|---|---|---|---|---|---|
| | $V_2O_5$ | $TiO_2$ | t, °C | Minutes | Starting compound | Organic compound, g./hour per liter of the catalyst | Air, l./hr. per l. of the catalyst | Ammonia, g./hr. per liter of the catalyst | Water, g./hr. per liter of the catalyst | Reaction temperature, °C. | Mononitrile | Yield | Dinitrile | Yield | Nitrile |
| 29 | 1 | 4 | 800 | 90 | 2-chloro-p-xylene | 78 | 2,100 | 96 | 460 | 380 | 2- and 3-chloro-p-tolunitriles | 55 | 2-chloro-terephthalic dinitrile | 18 | 78 |
| 30 | 1 | 8 | 900 | 90 | 2,5-dichloro-p-xylene | 42 | 2,600 | 96 | 500 | 320 | 2,5-dichloro-p-tolunitrile | 20 | 2,5-dichloroterephthalic dinitrile | 45 | 65 |
| 31 | 1 | 8 | 900 | 90 | do | 42 | 2,600 | 96 | 500 | 400 | do | 65 | do | 5 | 70 |
| 32 | 1 | 8 | 900 | 90 | 2,3,5,6-tetrachloro-p-xylene | 45 | 2,100 | 64 | 770 | 380 | 2,3,5,6-tetrachloro-p-nitrile | 60 | 2,3,5,6-tetrachloroterephthalic dinitrile | 10 | 70 |
| 33 | 1 | 4 | 800 | 90 | 2-bromo-p-xylene | 40 | 2,100 | 64 | 500 | 400 | 2- and 3-bromo-p-tolunitrile | 55 | 2-bromoterephthalic dinitrile | 5 | 61 |
| 34 | 1 | 8 | 900 | 90 | do | 40 | 2,100 | 64 | 500 | 400 | do | 55 | do | 7 | 62 |
| 35 | 1 | 4 | 900 | 90 | 2,5-dibromo-p-xylene | 58 | 2,100 | 68 | 360 | 360 | 2,5-dibromo-p-tolunitrile | 64 | 2,5-dibromoterephthalic dinitrile | 8 | 72 |
| 36 | 1 | 8 | 800 | 90 | do | 58 | 2,100 | 68 | 360 | 380 | do | 61 | do | 7 | 68 |
| 37 | 1 | 16 | 950 | 90 | do | 58 | 2,100 | 68 | 360 | 380 | do | 66 | do | 10 | 76 |
| 38 | 1 | 4 | 800 | 90 | 2-iodo-p-xylene | 46 | 1,700 | 64 | 460 | 380 | 2- and 3-iodo-p-tolunitriles | 58 | 2-iodo-1 terephthalic dinitrile | 4 | 76 |
| 39 | 1 | 8 | 900 | 90 | 2,5-diiodo-p-xylene | 62 | 2,100 | 96 | 460 | 310 | 2,6-diiodo-p-tolunitrile | 48 | 2,5-diiododoterephthalic dinitrile | 25 | 73 |
| 40 | 1 | 16 | 950 | 90 | 4-bromo-m-xylene | 97 | 2,100 | 96 | 700 | 380 | 4- and 6-bromo-m-tolunitriles | 52 | 4-bromo-isophthalic dinitrile | 5 | 57 |
| 41 | 1 | 16 | 950 | 90 | 4-iodo-m-xylene | 85 | 2,100 | 96 | 700 | 370 | 4- and 6-iodo-m-tolunitriles | 49 | 4-iodo-isophthalic dinitrile | 6 | 55 |

EXAMPLE 42

91 gr. of $V_2O_5$ and 639 gr. of $TiO_2$ (with the mole ratio $V_2O_5:TiO_2 = 1:16$) were pressed into tablets 3–5 mm. in size and exposed to heat treatment in air at 900° C. for 60 minutes. The catalyst was charged into a reactor fitted with three reaction pipes of stainless steel 20 mm. in diameter and 1500 mm. in length. A vaporous mixture of 3-picoline, air, ammonia and water was passed through the reactor. There was supplied 60 gr. of 3-picoline, 3200 liters of air, 137 gr. of ammonia and 800 gr. of water/hour per liter of the catalyst. The experiment was carried out for 20 hours. The total amount of 3-picoline supplied was 253.8 gr.

The reaction products were scrubbed by water in scrubbers. Unreacted picoline was extracted with petroleum ether from the scrubbed solution. After the solvent was distilled out 250 gr. of nicotinic nitrile was obtained comprising 89% of the theoretical amount as calculated from the 3-picoline supplied. Nicotinic nitrile was hydrolyzed, nicotinic acid was obtained in theoretical amounts, having the melting point of 228° C. and neutralization coefficient 123.

EXAMPLE 43

182 gr. of $V_2O_5$, 639 gr. of $TiO_2$ and 1 gr. of $WO_3$ (with the mole ratio $V_2O_5:TiO_2:WO_3 = 1:8:0.005$) were pressed into tablets and exposed to heat treatment in air at 900° C. for 90 minutes. The catalyst was charged into a reactor described in Example 42. A mixture of vapors of 3-picoline, air, ammonia and water was passed through the reactor at 395° C. There was supplied 60 gr. of 3-picoline, 3200 liters of air, 137 gr. of ammonia and 800 gr. of water/hour per liter of the catalyst. The total amount of 3-picoline supplied was 253.8 gr.

The recovery and analysis of the reaction products were the same as in Example 42. There was obtained 246 gr. of nicotine nitrile comprising 82% of the theoretical amount as calculated from the 3-picoline supplied.

Data on synthesis of other cyanopyridines with catalysts of various ratios of vanadium and titanium oxides are presented in Table 4 (Example Nos. 44–54).

TABLE NO. 4

| Number | Catalyst composition, moles | | Heat treatment conditions | | Rate of feed | | | | Reaction temperature, °C. | Reaction products | Yield percent of theoretical amount as calculated from starting materials |
|---|---|---|---|---|---|---|---|---|---|---|---|
| | $V_2O_5$ | $TiO_2$ | t, °C | Minutes | Starting compound | Organic compound, g./hour per liter of the catalyst | Air, l./hr. per l. of the catalyst | Ammonia, g./hr. per liter of the catalyst | Water, g./hr. per liter of the catalyst | | | |
| 44 | 1 | 8 | 900 | 90 | 4-picoline | 63.0 | 5,000 | 75 | 920 | 390 | 4-cyano pyridine | 91 |
| 45 | 1 | 16 | 900 | 90 | do | 63.0 | 5,000 | 75 | 920 | 390 | do | 94 |
| 46 | 1 | 32 | 950 | 90 | do | 63.0 | 5,000 | 75 | 920 | 360 | do | 90 |
| 47 | 1 | 8 | 900 | 90 | 3-ethylpyridine | 60.0 | 4,800 | 97 | 860 | 390 | 3-cyano pyridine | 85 |
| 48 | 1 | 16 | 900 | 90 | do | 60.0 | 4,800 | 97 | 860 | 390 | do | 88 |
| 49 | 1 | 8 | 900 | 90 | 4-ethylpyridine | 65.0 | 4,000 | 105 | 930 | 405 | 4-cyano pyridine | 95 |
| 50 | 1 | 16 | 950 | 90 | do | 65.0 | 4,000 | 105 | 930 | 390 | do | 93 |
| 51 | 1 | 32 | 900 | 90 | do | 65.0 | 4,000 | 105 | 930 | 360 | 2-cyano pyridine | 65 |
| 52 | 1 | 8 | 900 | 90 | 2-picoline | 58.0 | 3,200 | 92 | 800 | 390 | do | 62 |
| 53 | 1 | 16 | 900 | 90 | do | 58.0 | 3,200 | 92 | 800 | 405 | do | 62 |
| 54 | 1 | 4 | 800 | 80 | 2-methyl-5-ethylpyridine | 40.0 | 3,200 | 120 | 800 | 320 | 2,5-dicyano pyridine | 61 |

What is claimed is:

1. A method for preparing a vanadium oxide-titanium oxide catalyst for vapor-phase oxidation and oxidizing ammonolysis of aromatic and heterocyclic compounds comprising preparing a powdery mixture of vanadium pentoxide and titanium dioxide in the mole ratio of 1:0.6 to 32, respectively; pressing the mixture of oxides into tablets and heating said tablets in air at a temperature of from 650° C. to 1000° C.

2. A method accordinng to claim 1, comprising adding an oxide of a metal of variable valence to the powdery mixture of the starting components before pressing, said metal oxide being selected from the group consisting of an oxide of Cr, Mn, Cu, Nb, Mo, Ag, Sn, Ta, W, Bi, and Th.

3. A method of claim 1 wherein niobium oxide is added to the powdery mixture of the starting components before pressing.

4. A method of claim 1 wherein molybdenum oxide is added to the powdery mixture of the starting components before pressing.

5. A method of claim 1 wherein tungsten oxide is added to the powdery mixture of the starting components before pressing.

References Cited
UNITED STATES PATENTS

| | | | |
|---|---|---|---|
| 3,215,644 | 11/1965 | Kakinoki | 252—440 |
| 2,698,306 | 12/1954 | Mateczyk | 252—464 |
| 2,510,803 | 6/1950 | Cooper | 252—464 |
| 3,565,919 | 2/1971 | Friedrichsen | 260—346.4 |

DANIEL E. WYMAN, Primary Examiner

W. J. SHINE, Assistant Examiner

U.S. Cl. X.R.

252—461, 471, 476